Patented Aug. 7, 1951

2,563,776

UNITED STATES PATENT OFFICE 2,563,776

α-SUBSTITUTED ACRYLIC ACIDS AND ESTERS AND POLYMERS THEREOF

Joseph B. Dickey and Harry W. Coover, Jr., Rochester, N. Y., assignors to Eastman Kodak Company, Rochester, N. Y., a corporation of New Jersey No Drawing. Application December 9, 1949, Serial No. 132,217

15 Claims. (Cl. 260—77.5)

This invention relates to α-(alkoxycarbonamido)-acrylic acids, esters and homopolymers and copolymers thereof.

Various α-substituted acrylic acids and esters, their polymers and copolymers, have previously been described in the patent literature and elsewhere. However, to the best of our knowledge, the α-(alkoxycarbonamido) substituted compounds of the invention have not previously been described.

The compounds of the invention have the following general structure:

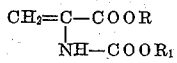

wherein R is hydrogen or an alkyl group preferably of from 1 to 4 carbon atoms and $R_1$ is an alkyl group preferably of from 1 to 4 carbon atoms. More specifically, R and $R_1$ can be methyl, ethyl, propyl, isopropyl, butyl, etc.

The α-(alkoxycarbonamido)-acrylic acids of our invention therefore have the structure:

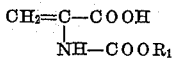

wherein $R_1$ is as above mentioned.

The α-(alkoxycarbonamido)-acrylic acid esters have the structure:

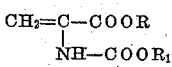

wherein R and $R_1$ are both alkyl groups preferably from 1 to 4 carbon atoms but which may be different depending upon the starting material and the reactant used in esterification.

The α-(alkoxycarbonamido)-acrylic acids and esters readily homopolymerize and copolymerize with one or more monomers under the usual conditions. The usual catalyst, such as hydrogen peroxide, benzoyl peroxide, potassium persulfate, or ultraviolet light, and so forth, are used, and certain so-called activating agents, such as sodium bisulfite, may be used in connection with the usual catalyst.

The homopolymers are soluble in many common solvents such as acetone and alcohol. Further, the homopolymers exhibit many valuable properties such as high clarity, hardness, toughness, high heat distortion temperatures, and so forth. Certain of these properties such as hardness and heat distortion temperatures depend on the length of the alkyl chains. For example, the homopolymer of methyl-α-(methoxycarbonamido)-acrylate is harder and has a higher heat distortion point than the homopolymer of propyl-α-(propoxycarbonamido)-acrylate.

By the copolymerization of these new monomers with other monomers, polymers having many properties can be prepared. For example, by copolymerizing 20% by weight of methyl-α-(methoxycarbonamido)-acrylate with acrylonitrile, a polymer is obtained which has a softening point above 200° C. and can be spun into fibers which have excellent dyeing properties.

Other monomers containing a polymerizable $CH_2=C<$ or $-CH=C<$ group which can be polymerized with the monomers of general formulas above include vinyl halides, acrylates, the α-methacrylates, fumarates, maleates, vinyl esters, alkyl alkenyl ketones, α-acyloxy-alkenyl nitriles, alkenyl nitriles, and hydrocarbons containing conjugated olefinic unsaturation, such as styrene.

More specifically, monomers which can be polymerized with the compounds of the invention are those set forth in the Magoffin et al. U. S. patent application Serial No. 773,736, filed September 12, 1947, now U. S. Patent 2,487,885. Copolymers with acrylonitriles, vinyl esters, styrenes, and vinyl halides are especially valuable.

The acrylic acids and esters of the invention may be prepared, for example, from the α,α-bis-(alkoxycarbonamido)-propionic acids as illustrated by the following reaction:

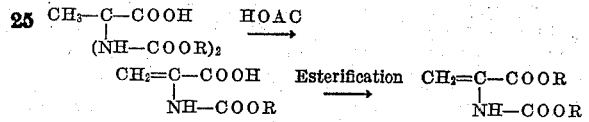

The α,α-bis-(alkoxycarbonamido)-propionic acids may be prepared by the reaction of alkyl carbamates with pyruvic acid by the method of Kraft and Herbst, J. Org. Chem. 10, 496 (1945). Suitable alkyl carbamates are, for example, methyl-, ethyl-, propyl-, isopropyl-, n-butyl-, isobutyl-carbamates, etc.

According to the above reaction, the corresponding α,α-substituted propionic acid is heated with acetic acid to form the α-(alkoxycarbonamido)-acrylic acid which is then esterified by well-known methods, such as by treating the silver salt of the acrylic acid with an alkyl halide or by saturating an alcoholic solution of the acrylic acid with dry hydrogen chloride. The esters are then purified by distillation under reduced pressure.

The following examples give in detail methods of preparation of the monomers, homopolymers and copolymers of our invention:

*Example 1.—α-(Ethoxycarbonamido)-acrylic acid*

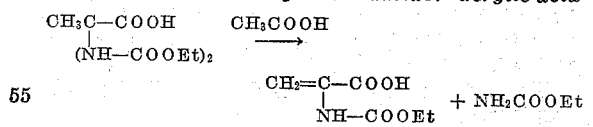

A solution of 54.8 grams of α,α-bis(ethoxycarbonamido)-propionic acid in 150 cc. of glacial acetic acid was refluxed for 15 minutes. The acetic acid was removed by distillation at 20 mm., and the urethane was removed at 1 mm. leaving the product as a viscous oil, soluble in ethanol and insoluble in hexane. The molecular weight of the acid as determined from its neutral equivalents was 158.

*Example 2.—a-(Isopropoxycarbonamide)-acrylic acid*

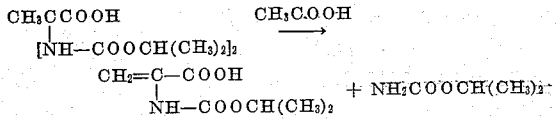

A solution of 9 grams of a,a-bis(isopropoxycarbonamido)-propionic acid in 25 cc. of glacial acetic acid was refluxed for 10 minutes. The acetic acid and the isopropyl carbamate were removed at low pressure. The product remained as a viscous oil, soluble in ethanol and insoluble in hexane. The molecular weight of the acid as determined from its neutral equivalents was 171.

*Example 3*

Ten grams of a-ethoxycarbonamido acrylic acid and 0.1 gram of potassium persulfate were dissolved in 100 ml. of distilled water. After heating for several hours at 50° C., a viscous aqueous solution resulted. The polymer can be precipitated by the addition of acetone.

*Example 4*

Ten grams of a-isopropoxycarbonamido acrylic acid was dissolved in 50 ml. of water and heated at 60° C. for 6–8 hours. The acid polymerized to give a viscous solution. The polymer can be precipitated by the addition of acetone to give a hard, white polymer.

*Example 5*

Two grams of a-methoxycarbonamido acrylic acid and 8 grams of acrylonitrile were added to 100 ml. of distilled water containing 0.1 gram of ammonium persulfate and 0.2 gram of sodium bisulfite. The reaction vessel was sealed from the outside air and maintained at 35–40° C. for 6 hours. A fine white insoluble polymer was formed which was filtered off, well washed with water, and dried. The polymer is soluble in dimethyl formamide and does not soften below 195° C.

*Example 6*

Eight grams of a-ethoxycarbonamido acrylic acid and 2 grams of vinyl acetate were added to 75 ml. of distilled water containing 0.3 gram of hydrogen peroxide. The polymerization was carried out by heating at 50° C. for 12 hours. A clear viscous solution resulted. The polymer can be precipitated by the addition of acetone. Hard, somewhat brittle films can be cast from the water solution of the polymer. The polymer has a softening point above 130° C.

*Example 7*

Nine parts of methyl methacrylate, 1 part of a-ethoxycarbonamido acrylic acid and 0.2 part of benzoyl peroxide were heated at 80° C. for 12 hours. A clear, hard polymer resulted. The polymer is soluble in acetone and can be readily molded.

Styrene can be substituted for methyl methacrylate.

*Example 8*

Five parts a-methoxycarbonamido acrylic acid, 2 parts of acrylamide and 3 parts of methacrylic acid were dissolved in 100 ml. of distilled water containing 0.2 gram of potassium persulfate and 0.2 gram of sodium bisulfite. The polymerization was completed by heating at 40° C. for 8 hours. A clear, viscous solution resulted. The polymer can be precipitated by the addition of acetone. The polymer has a softening point above 150° C.

*Example 9*

Ten grams of butadiene and 3 grams of a-methoxycarbonamido acrylic acid were polymerized in the presence of 40 grams of a 1.5% aqueous solution of potassium laurate as an emulsifying agent, 0.5 gram of hydrogen peroxide as a polymerization modifier and 0.02 gram of ferrous sulfate. The polymerization was complete in about 24 hours, and the product is a latex-like dispersion resembling material rubber latex.

The other a-substituted acrylic acids are polymerized in a similar manner.

*Example 10.—Methyl a-(ethoxycarbonamido)-acrylate*

A solution of 54.8 grams of a,a-bis(ethoxycarbonamido)-propionic acid in 150 cc. of glacial acetic acid was refluxed for 15 minutes. The acetic acid was removed under reduced pressure. A solution of 8.9 grams of sodium hydroxide in 50 cc. of water was added with cooling, followed by a solution of 37.6 grams of silver nitrate in 200 cc. of water. The silver salt thus formed was separated by filtration, washed twice with cold water and twice with acetone. The dry, powdered silver salt was added with stirring to 200 grams of methyl iodide containing about 0.05 gram each of trinitrobenzene and hydroquinone. During the addition, the heat of reaction causes the methyl iodide to reflux. The mixture was allowed to stir at room temperature for half an hour, filtered, and the filtrate was distilled.

At 50–80°/2 mm. 15.2 grams of pale yellow oil was collected. Upon redistillation 8.8 grams of methyl a-(ethoxycarbonamido)-acrylate was obtained as a clear liquid: B. P. 64–69°/2 mm., $N_D^{20}$ 1.4588, M. P. 6° C. Analysis for nitrogen: calculated 8.1%, found 8.1%.

*Example 11.—Methyl a-(propoxycarbonamido)-acrylate*

A solution of 10.0 grams of a,a-bis-(n-propoxycarbonamido)-propionic acid in 50 cc. of acetic acid was refluxed for 10 minutes. The acetic acid was removed under reduced pressure. A solution of 2.03 grams of sodium hydroxide in 15 cc. of water was added, followed by a solution of 6.15 grams of silver nitrate in 30 cc. of water. The silver salt was separated by filtration, washed with water, then actone. The dry, powdered silver salt was added to 30 cc. of methyl iodide with stirring. The mixture was filtered and the filtrate distilled. At 73–190°/1 to 4 mm. 4.15 grams of pale yellow oil was collected. This was redistilled to give 2.10 grams of methyl a-(n-propoxycarbonamido)-acrylate; B. P. 70–71°/1 mm., $N_D^{19}$ 1.4591, M. P. 17° C.

*Example 12.—Ethyl a-(isopropoxycarbonamido)-acrylate*

A solution of 15 grams of a,a-bis-(isopropoxycarbonamido)-propionic acid in 45 cc. of acetic acid was refluxed for 10 minutes. The acetic acid was removed under reduced pressure. Absolute ethanol, 100 cc. was added. The solution was saturated in the cold with dry hydrogen chloride and allowed to stand at room temperature for 1 hour. The alcohol was removed at reduced pressure. A solution of sodium ethoxide was added until the pH of the mixture was six. Sodium chloride was removed by filtration. The filtrate was distilled at reduced pressure to obtain the ethyl α-(isopropoxycarbonamido)-acrylate.

Example 13

Four grams of methyl α-(ethoxycarbonamido)-acrylate was polymerized at 60° C. in an atmosphere of nitrogen using 0.1% acetyl peroxide as a catalyst. The product is a clear, hard polymer which can be molded.

Example 14

Eight grams of methyl α-(n-propoxycarbonamido)-acrylate was polymerized at 60° C. in an atmosphere of nitrogen using 0.1% acetyl peroxide as a catalyst. A clear, hard polymer which can be molded is formed.

Example 15

Five grams of ethyl α-(isopropoxycarbonamido)-acrylate was polymerized by heating to 55° C. in an atmosphere of nitrogen. A clear, hard, moldable polymer is formed.

Example 16

Eight grams of methyl α-(ethoxycarbonamido)-acrylate and 2 grams of methyl methacrylate were copolymerized at 60° C. in an atmosphere of nitrogen using 0.1% benzoyl peroxide as a catalyst. The product is a clear, hard polymer which can be molded.

Example 17

Two grams of methyl α-(ethoxycarbonamido)-acrylate and 8 grams of methyl methacrylate were copolymerized at 60° C. in an atmosphere of nitrogen using 0.1% acetyl peroxide as a catalyst. The product is a clear, hard, moldable polymer.

Example 18

Eight grams of styrene and 2 grams of methyl α-(n-propoxycarbonamido)-acrylate were copolymerized at 60° C. in a nitrogen atmosphere using 0.1% acetyl peroxide as a catalyst. A clear, hard polymer which can be molded is formed.

Example 19

Six grams of vinyl acetate and 1 gram of ethyl α-(isopropoxycarbonamido)-acrylate were copolymerized at 60° C. in an atmosphere of nitrogen using 1.0% benzoyl peroxide as a catalyst. A clear, hard, moldable polymer is obtained.

Example 20

Five grams of acrylonitrile, 1.0 gram of methyl α-(ethoxycarbonamido)-acrylate, 0.055 gram of ammonium persulfate and 0.1 gram sodium bisulfite were placed in 45 cc. of distilled water. The polymerization began immediately and was complete after several hours at 50° C. The white polymer was filtered, washed and dried. The polymer is soluble in dimethylformamide and in dimethylacetamide. Fibers having good properties can be spun from this type of copolymer.

Example 21

Two grams of methyl α-(ethoxycarbonamido)-acrylate, 7 grams of vinyl chloride, 1 gram of soap, 0.05 gram of ammonium persulfate and 0.1 gram of ammonium bisulfite were added to 35 cc. of water in a pressure bottle. After 24 hours at 60° C., acetic acid was added and the white polymer was filtered, washed and dried. The product can be molded.

The above examples provide copolymers from mixtures of various proportions of the monomers of the invention with other monomers. In general, we can obtain valuable copolymers by polymerization of mixtures containing from 5–95% by weight of our monomers and 95–5% of other monomer or monomers by methods of the examples. However, for our purposes we prefer the range 5–50% by weight.

We claim:

1. α-Substituted acrylic compounds of the general formula

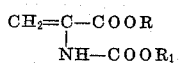

wherein R represents a member of the group consisting of hydrogen and an alkyl group of from 1 to 4 carbon atoms, and $R_1$ represents a member of the group consisting of an alkyl group having from 1 to 4 carbon atoms.

2. α-Substituted acrylic acids of the general formula

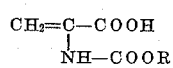

wherein R is an alkyl group of from 1 to 4 carbon atoms.

3. α-Substituted acrylic acid esters of the general formula

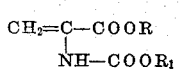

wherein R and $R_1$ each are alkyl groups of from 1 to 4 carbon atoms.

4. The α-substituted acrylic acid

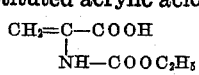

5. The α-substituted acrylic acid ester

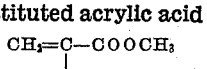

6. The α-substituted acrylic acid ester

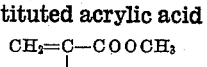

7. The α-substituted acrylic acid ester

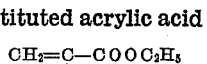

8. A polymer of an α-substituted acrylic compound of the general formula

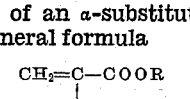

wherein R represents a member of the group consisting of hydrogen and an alkyl group of from 1 to 4 atoms, and $R_1$ represents a member of the group consisting of an alkyl group having from 1 to 4 carbon atoms.

9. A polymer of an α-substituted acrylic acid of the general formula

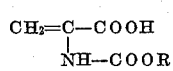

wherein R is an alkyl group of from 1 to 4 carbon atoms.

10. A polymer of an α-substituted acrylic acid ester of the general formula

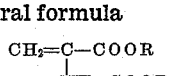

wherein R and $R_1$ each are alkyl groups of from 1 to 4 carbon atoms.

11. A copolymer obtained by the polymerization of a mixture comprising a compound of the general formula $$CH_2=C-COOR$$
$$\quad\ |$$
$$NH-COOR_1$$

wherein R represents a member of the group consisting of hydrogen and an alkyl group of from 1 to 4 carbon atoms, and $R_1$ represents a member of the group consisting of an alkyl group having from 1 to 4 carbon atoms, and a compound containing a polymerizable —CH=C< group.

12. A copolymer obtained by the polymerization of a mixture comprising a compound of the general formula $$CH_2=C-COOR$$
$$\quad\ |$$
$$NH-COOR_1$$

wherein R represents a member of the group consisting of hydrogen and an alkyl group of from 1 to 4 carbon atoms, and $R_1$ represents a member of the group consisting of an alkyl group having from 1 to 4 carbon atoms, and a compound containing a polymerizable $CH_2=C<$ group.

13. A copolymer obtained by the polymerization of a mixture comprising a compound of the general formula $$CH_2=C-COOH$$
$$\quad\ |$$
$$NH-COOR$$

wherein R is an alkyl group of from 1 to 4 carbon atoms, and a compound containing a polymerizable $CH_2=C<$ group.

14. A copolymer obtained by the polymerization of a mixture comprising a compound of the general formula $$CH_2=C-COOR$$
$$\quad\ |$$
$$NH-COOR_1$$

wherein R and $R_1$ each are alkyl groups of from 1 to 4 carbon atoms, and a compound containing a polymerizable $CH_2=C<$ group.

15. A copolymer obtained by the polymerization of a mixture comprising a compound of the general formula $$CH_2=C-COOR$$
$$\quad\ |$$
$$NH-COOR_1$$

wherein R represents a member of the group consisting of hydrogen and an alkyl group of from 1 to 4 carbon atoms, and $R_1$ represents a member of the group consisting of an alkyl group having from 1 to 4 carbon atoms, and a compound of the group consisting of acrylonitrile, styrene, vinyl acetate and vinyl chloride.

JOSEPH B. DICKEY.
HARRY W. COOVER, JR.

REFERENCES CITED

The following references are of record in the file of this patent:

Rinkes: Rec. Trav. Chim., 46, 274 (1927).
Hoch: Compt. rend., 201, 560–562 (1935).